United States Patent [19]

Carpenter, Jr.

[11] Patent Number: 4,679,114
[45] Date of Patent: Jul. 7, 1987

[54] METHOD AND EQUIPMENT FOR LIGHTNING PROTECTION THROUGH ELECTRIC POTENTIAL NEUTRALIZATION

[76] Inventor: Roy B. Carpenter, Jr., 9444 Tierra Blanca, Whittier, Calif. 90603

[21] Appl. No.: 849,790

[22] Filed: Apr. 9, 1986

[51] Int. Cl.4 .............................................. H02H 3/22
[52] U.S. Cl. ..................................... 361/117; 361/111
[58] Field of Search ........................ 361/111, 117–119; 174/3, 2, 222, 231

[56] References Cited

U.S. PATENT DOCUMENTS

| | | | |
|---|---|---|---|
| 623,033 | 11/1899 | Raunacher | 361/117 X |
| 863,773 | 8/1907 | Berg | 361/118 |
| 2,735,963 | 2/1956 | Baker et al. | 361/111 X |
| 3,209,207 | 9/1965 | Sota et al. | 361/111 |
| 3,524,133 | 8/1970 | Arndt | 361/111 X |
| 4,112,418 | 9/1978 | Ishikawa et al. | 361/118 X |
| 4,156,838 | 5/1979 | Montague | 361/118 X |
| 4,652,694 | 3/1987 | Goldman et al. | 361/117 X |

*Primary Examiner*—J. R. Scott
*Assistant Examiner*—A. Jonathan Wysocki

[57] ABSTRACT

An equipment for a preventive lightning protection of at least partly neutralizing the electric potentials of the atmosphere's charges. This is accomplished through the application of a high-potential d.c. voltage to a vertical structural post carrying on its top a member adapted to radiate an electric field of a magnitude, polarity and duration adjusted by a control unit in response to the condition of the atmospheric charge as sensed and relayed to the control unit by a sensor.

3 Claims, 2 Drawing Figures

METHOD AND EQUIPMENT FOR LIGHTNING PROTECTION THROUGH ELECTRIC POTENTIAL NEUTRALIZATION

BACKGROUND

Lightning protection for structures and equipment together with that for persons working or living near those structures and equipment has been an important objective since the early days of electrical experiences and practices. Originating at that time were various principles and devices, some of which retained their general usefulness through this day and age. The typical representatives of this kind are the lightning arrester and the lightning rod. Because of their age, it may be unrealistic to even search for related matter which would have a bearing on the subject case or its state of the art. The same appears to hold true for derivatives of the lightning rod concept, obviating justifiably so, the applicant's crossreference survey. The major and probably only feature of the lightning rod operation was and still is its offering the lightning stroke a comparatively smooth and short path to its grounded base, thereby lessening the probability of a direct lightning stroke, generally regardless of the polarities of the charges in the clouds or in the ground involved. Thusly, a lightning rod is a therapeutic type of device which becomes active during and after the fact, respectively. It should, however, be borne in mind that very large currents of some lightning stroke will create deleterious effects on the lightning rod system, its accessories and, perhaps, cause also damage to adjacent property and injuries to persons.

BRIEF SUMMARY OF THE INVENTION

In contrast to the aforementioned characteristics, those of the subject improvement provide a preventive lightning protection through the process of electric potential neutralization. This is accomplished through the use of a d.c. charge of considerable magnitude applied in the required polarity, to a structural member erected above and about the to be protected area, whereby the respective polarity is selected and controlled upon the sensing of and in opposition to the polarity of the prevailing atmospheric charges.

A typical structure of the subject, single-unit variety consists of a downwardly-open body having the form of a spherical segmemt having a chord of 4 to 6 ft in length, mounted on top of a vertical post of a material having the required structural rigidity. This post provides an electrically insulating member separated from the protected structure. A high-voltage d.c. source is electrically connected to the spherical segment whereby, for example, the positive d.c. pole can be connected to it and the negative d.c. pole to ground and in a reversed order, selectively. The selection of the polarity application is accomplished through the response of a sensor to the existing atmospheric and related conditions causing the control unit to connect the high-voltage source to the post and ground terminals in the then required polarities. Whereas the aforementioned polarity choice, based upon the respective frequency of occurrence, is appropriate for the conditioning of the subject equipmet for the majority of cases, the reversed polarities can readily be applied by the control unit upon the respective response of the sensor.

If the area or the objects arranged on this area are too large for the protection by only one equipment in accordance with this invention, several such sets of equipment may be positioned strategically on or about the area, or so-called corona ring structures may be installed along the perimeter of such an area, to be charged electrically corresponding to the prevailing polarity and conditions.

In either example, the spherical segment body will be charged in the same polarity as the cloud(s) and the atmosphere in the area. In this manner, the electric potentials of the atmosphere charges will be wholly or partly neutralized, repelled, and, at least, kept away from the objects to be protected by the subject equipment, respectively. The result is that the protected area will be electrically neutral or "invisible" to lightning.

It should be noted that this feature is the substance of this invention, aside from various coacting, also believed to be novel characteristics described herein.

Further advantages of and applications for the subject improvement per se and over conventional procedures will become more apparent from the following description and the accompanying drawing.

In the drawing, forming a part of this application:

FIG. 1 is a schematic of the front elevation of a typical single-unit protection equipment and FIG. 2 portrays, likewise schematically, a protective bypass system for the unit illustrated in FIG. 1.

DETAILED DESCRIPTION

Figure 1:
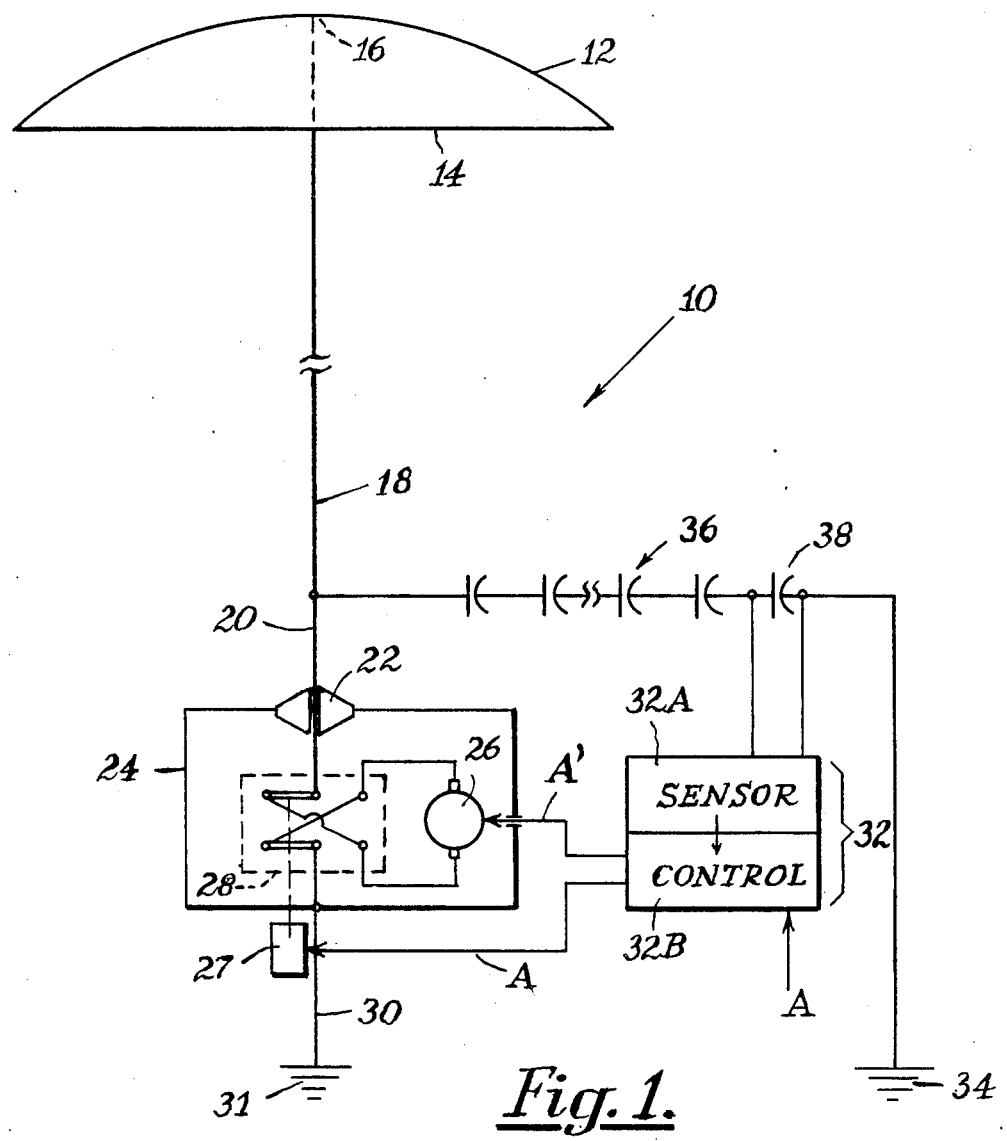

Referring now to the drawing, wherein like reference numerals designate like or corresponding parts and, more particularly, to FIG. 1, portraying, however schematically, a typical, single-unit protection equipment 10, hereinafter called "equipment". This equipment 10 is composed of a downwardly-open shell 12 having the form of a rather shallow spherical segment and a chord 14 which is from 4 to 6 ft long. It should be noted that a flat disc, 4 to 6 ft (121 to 182 cm) in diameter, can be employed in place of the aforementioned shell 12, provided its edges are rounded into a 180 degrees curve downward of not less than 25 cm radius. Said downwardly-open body 12 is mounted on the upper end 16 of a vertical post 18, the lower end 20 of which is mounted on a member 22 of an electrical insulating material. In turn, the member 22 is, for example, mounted at the top of an enclosure 24. This enclosure 24 contains, typically and shown symbolically, a d.c. high-potential power source 26 energized from, say, a utility net as indicated by the arrow "A"', a polarity-reversing contactor 28, applying the d.c. potential in the required polarity direction to the lower end 20 of the vertical post 18 and to the enclosure 24, connected through the lead 30 to ground 31, which may be common with any other ground used in this example.

A combination sensor and control unit 32 is provided to, firstly, sense the tendency of the atmospheric condition(s) and, especially, the electric charges and their polarities and, secondly, to prepare the setting of the controls for the transmission of the required signal for the energizing of the actuating coil 27 of the reversing contactor 28 for the transfer of its two-pole, double-throw switch 28A to the required position. A plurality of in series connected capacitors 36, acting as a voltage divider, is connected across the cal post 18 and the ground 34. The sensor 32A is connected across the last capacitor 38, which is the most remote from the potential of the vertical post 18 and closest to the ground potential. Upon its response to the prevailing atmospheric conditions, it effects the setting of the controls 32B which, energized by the utility power connection indicated by the arrow "A", activates through its output the polarity reversing contactor 28 accordingly to maintain and to reverse, selectively, this position as necessitated by those ambient conditions. It is apparent that various auxiliary component parts have been omitted from both the drawing and the description not to obscure the presentation of the salient features of this improvment. It should also be noted that, particularly the vertical post 18 and the downwardly-open shell 12 are sturdy mechanical structural members and that their erection with respect to the enclosure 24 may vary considerably from the simplified mutual parts relations shown in the schematic FIG. 1, so long as those structural configurations comply with the laws of physics extending to the behavior of lightning strokes and related atmospheric manifestations as applicable to this case.

Figure 2:
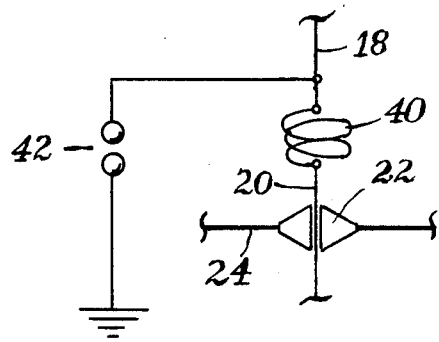

Because the herein described equipment is not a lightning rod and, therefore, not supposed, nor expected to be struck by lightning nor to provide a path for the lightning bolt to ground, it should be protected to most but excessive charge and discharge currents, respectively. A possible protective bypass arrangement is shown schematically in FIG. 2. A current-limiting choke coil 40, acting as a reactor, is placed in series with the vertical post 18 near its attachment at its lower end to the insulating member 22. This choke coil 40 has very few turns and no iron core and is designed carefully so as to resist the deforming dynamic forces occurring when heavy currents pass through it. To provide a passage for heavy currents which are prevented from flowing through the equipment inside the enclosure 24, a lightning arrester 42, in this example of the air-gap variety using spherical electrodes, is connected across the choke coil 40 and the enclosure 24 to ground 31, however rated to safely hold the highest operating voltage generated by the d.c. high-potential power source for the intended protective equipment operation.

It is firmly believed that the comments made on specific parts forms, fits and functions as well as on the entire operation of the subject invention interposed throughout the foregoing texts will obviate any additional explanations.

It is understood that the herein shown and described embodiments of the subject invention are but illustrative and that variations, modifications and alterations are feasible within the spirit of these teachings.

I claim:

1. A method for the protection of areas and objects arranged on them against lightning strikes through electric potential neutralization comprising:

sensing the presence, the magnitude and the polarity of at least one electric charge above an area intended to be protected, setting controls upon the sensing of said at least one electric charge, activating a d.c. high-potential power source to an output potential of a magnitude and in a polarity so as to neutralize said electric charge in accordance with said control setting, adjusting the magnitude and the polarity of said output potential in accordance with any changes of the magnitude and the polarity, respectively, of said charge as sensed and as commanded by said control upon being activated by said sensor for the duration of each charge presence, terminating said d.c. high-potential power source operation and its output upon the cessation of charge magnitude and polarity sensing and of the control activation, restoring said sensor, said control and said d.c. high-potential power source for a subsequent operation.

2. Equipment for the protection of areas and objects arranged on them against lightning strikes through electric potential neutralization comprising:

a vertical post of an electrically conductive material having an upper and a lower end, a downwardly-open shell having the shape of a large-diameter-spherical segment mounted on said upper end of said vertical post, a polarity-reversing contactor having two input terminals and two output terminals, one said output terminal connected with said spherical segment, the other said output terminal connected with the ground, respectively, an adjustable d.c. high-potential power source having two input and two output terminals, one said output terminal connected with one said input terminal of said polarity-reversing contactor, the other said output terminal connected with the other said input terminal of said polarity-reversing contactor, said two input terminals connected to the two poles of a utility power source, a capacitive voltage divider having taps connected between said spherical shell and ground, a combination sensor and control unit, said sensor connected across two operationally suitable taps of said voltage divider capable of sensing the tendency of the atmospheric condition, the presence, the magnitude and the polarity of any charges and capable of transmitting the respective command signals, said control electrically connected to said sensor so as to receive said command signals for the establishment of the required magnitude of voltage and for the required setting of said polarity-reversing contactor for the applicable polarity selection.

3. Equipment for the lightning protection through electric potential neutralization as defined in claim 2 wherein a choke coil is inserted in series between said spherical shell and said high-voltage source and a lightning arrester is connected in parallel with said choke coil between said vertical post and ground.

* * * * *